3,780,188
METHOD OF INCREASING PROTEIN CONTENT OF WHEAT FLOUR BASED BAKED AND FRIED PRODUCTS AND COMPOSITIONS FOR PREPARING SAME

Cho C. Tsen and William J. Hoover, Manhattan, Kans., assignors to Kansas State University Research Foundation, Manhattan, Kans.
No Drawing. Filed Oct. 5, 1970, Ser. No. 78,239
Int. Cl. A21d 2/16, 2/26, 13/06
U.S. Cl. 426—152                              16 Claims

ABSTRACT OF THE DISCLOSURE

A protein fortified composition for preparing wheat flour based bread, baked goods and fried dough products, and a method of incorporating protein supplements into bread or other baked or fried product doughs containing wheat flour without adversely affecting the product volume, texture, shelf life, crumb grain or organoleptic properties of the bread, or baked or fried product produced therefrom, by adding to the dough ingredients from 0.1% to 3% of either the sodium or calcium salts of an acyl lactylate of $C_{14}$–$C_{22}$ fatty acids, or ethoxylated mono- and diglycerides of $C_{14}$–$C_{18}$ fatty acids (polyoxyethylene (20) mono- and diglycerides of the fatty acids) along with the protein supplement. The protein additives may for example be selected from the group consisting of soy flour, soy isolates, nonfat milk solids, whey products, fish protein concentrate, cottonseed, flour, chick pea flour, sesame seed flour, corn-soy-milk blend flour, wheat protein concentrate, wheat gluten, defatted wheat germ, Torula yeast, wheat-soy blend flour, edible single cell proteins, and mixtures thereof. Generally the quantity of protein supplement added does not significantly exceed that required to furnish a quantity of protein essentially equal to that provided by the wheat flour in the dough.

---

This invention relates to a novel high protein, wheat flour based composition for preparing bread, baked goods, or fried dough porducts therefrom wherein a protein supplement may be incorporated with the wheat flour without deleteriously affecting the quality and organoleptic properties of the food product by virtue of the incorporation of the sodium or calcium salts of an acyl lactylate of $C_{14}$–$C_{22}$ fatty acids (preferably sodium stearoyl-2-lactylate), or polyoxyethylene (20) mono- and diglycerides of $C_{14}$–$C_{18}$ fatty acids, into the dough prior to baking of the bread or baked goods, or frying of the dough product. Exemplary baked goods are rolls, biscuits and buns while doughnuts are an example of fried dough products which can benefit from protein supplementation.

Wheat based baked or fried goods are staple foods in many countries of the world because of their relatively high caloric value, ready availability of wheat flour at an economical price, and the attractive organoleptic and appearance properties of the food products. However, it is desirable to increase the nutritional content of the bread, and other wheat based foods, particularly from a protein standpoint. It has long been recognized in this respect that breads could be improved in major respects by incorporation of a protein supplement therein in lieu of a part of the wheat flour normally in the bread dough, or as an additive thereto. Soy flour for example is an especially attractive protein supplement for flour based baked products such as bread, biscuits or rolls, and fried goods such as doughnuts, because of the high content of good nutritional quality protein in soy flour and the fact that such flour is available at a sufficiently economical price with respect to the cost of wheat flour, to permit substitution of soy flour for a part of the wheat flour normally introduced as an ingredient of the dough composition.

Supplementation of the protein content of wheat flour based bread and baked or fried product doughs to a level to significantly improve nutrition has not heretofore been successful because of the adverse affect on the quality of the food product attributable to the supplement added, not only from the organoleptic standpoint but also the appearance, physical quality and shelf life of the baked goods. In order for a protein supplement to be commercially practical, the additive must be economical, uniform in quality and not significantly change the bread making or baked or fried product producing properties of the dough with little or no adjustment in the overall formula. Finally, the additive should not alter or impair the quality of the bread, or baked or fried dough product. Full satisfaction of these requirements on a commercially feasible basis is the most important object of this invention.

Soy flour for example is a particularly valuable additive for bread not only because of its high protein content but also by virtue of the fact that it contains 3.2% to 3.8% lysine as compared with 0.375% in wheat flour. Thus, with the addition of 12 grams of soy flour to 100 grams of wheat flour the lysine content of this mixture will be more than doubled to a value of from 0.76% to 0.83%. The resulting product provides an exceptional vehicle for nutritional improvement of human diet. Although enrichment programs providing for the addition of vitamins and minerals have been successfully used for many years, provision of additional protein in the diet at a low cost has thus far evaded really successful implementation. This is true despite the fact that protein, both quantity and nutritional quality, is the most needed nutrient to improve man's diet. However, it has heretofore been found that the addition of any non-wheat protein or high protein wheat derived product to bread in an amount necessary to significantly improve its nutritive value caused a loss in load volume, poorer texture and a general loss of organoleptic qualities.

It has now been discovered that by incorporation of from 0.1% to 3% of either the sodium or calcium salts of an acyl lactylate of $C_{14}$–$C_{22}$ fatty acids (preferably stearoyl-2-lactylate or to a slightly lesser degree calcium stearoyl-2-lactylate), or the condensation product of from 10–95 parts by weight of ethylene oxide and correspondingly from 90–5 parts by weight of a partial glycerol ester of a $C_{10}$–$C_{24}$ fatty acid containing at least 10% monoglyceride content with diglycerides, triglycerides and glycerine constituting the balance (preferably polyoxyethylene (20) mono- and diglycerides of $C_{14}$–$C_{18}$ fatty acids having an acid number within the range of 0–2, an hydroxyl number of 65–80, a saponification number of 65–75, and an oxyethylene content of 60.5%–65.0%) in the bread or other baked or fried goods dough, a sufficient amount of non-wheat or wheat protein supplement may be added to the composition in amounts to improve the nutritive quality of the bread without a subsequent loss in loaf volume and organoleptic characteristics. Incorporation of an additive such as sodium stearoyl lactylate, calcium stearoyl lactylate, or the specified ethoxylated glyceride composition permits supplementation of the wheat flour based dough with any one or more of a number of protein additives which may for example be selected from the group consisting of soy flour, soy isolates, nonfat milk solids, whey products, fish protein concentrate, cottonseed flour, chick pea flour, sesame seed flour, corn-soy-milk blend flour, wheat protein concentrate, wheat gluten, defatted wheat germ, Torula yeast, wheat soy blend flour, edible single cell proteins, compatible with wheat flour for baking purposes, and mixtures thereof. Generally speaking, the quantity of protein supplement added will not need to significantly exceed that required to furnish a quantity of protein essentially equal to the quantity of protein provided by the wheat flour content of the dough.

It is a further important object of the invention to provide a bread or other baked or fried goods dough composition having a wheat flour base wherein a protein supplement may be added thereto wtihout significantly altering the processing conditions required for preparation of the food product therefrom, in the baking or frying conditions themselves, or in the equipment required for mixing and processing of the dough. In this respect, the invention lends itself to permitting incorporation of significant amounts of non-wheat or wheat protein supplements in bread doughs or other baked or fried products at significant nutritive levels without substantially increasing the cost of the food item by virtue of the fact that the active ingredient permitting incorporation of the protein additive in the dough is not only available at a practical commercial cost, but also is effective at a relatively low concentration.

Another significant object of the invention is to provide an improved method of increasing the nutritive value of breads or other baked or fried goods having a wheat flour base wherein the protein supplement and the sodium stearoyl lactylate or the ethoxylated glyceride composition may be packaged as a separate item for incorporation into bread or baked or fried goods dough ingredients at the time of mixing thereof thus permitting supplementation of the dough with high nutritive constituents without altering the dough preparation procedure or making it necessary to install additional treating, handling or mixing equipment.

In this connection, it is an object of the invention to provide a novel method for incorporating protein supplements into bread dough which is equally applicable to straight dough, short-time dough, no-time dough, sponge dough or continuous dough bread making processes without alteration of the present sequence of steps involved therein.

In accordance with the preferred concepts of the present invention, incorporation of from 0.1% to 3% of sodium stearoyl - 2-lactylate, calcium stearoyl-2-lactylate, or the ethoxylated mono- and diglycerides of $C_{14}$–$C_{18}$ fatty acids (polyoxyethylene (20) mono- and diglycerides of the fatty acids), based on the total weight of wheat flour in a wheat flour base bread or baked or fried product dough, permits incorporation of a non-wheat or wheat protein supplement therein in an amount at least as high as that quantity which provides an amount of protein approximately equal to the protein content of the wheat flour. For example. 12 parts by weight of soy flour may be added to a conventional bread dough composition for each 100 parts of standard wheat flour contained therein, with the preferred amount of sodium stearoyl - 2-lactylate, calcium stearoyl-2-lactylate, or the ethoxylated glyceride composition in each instance being 0.5% baker's wheat (i.e. 0.5 part by weight for each 100 parts by weight of wheat flour in the dough). Best results are obtained when sodium stearoyl-2-lactylate is used as the additive. However, calcium stearoyl-2-lactylate and the glyceride composition defined above are equally usable although in certain instances, and particularly with respect to the use of calcium stearoyl-2-lactylate as the additive, a somewhat larger relative amount thereof as compared with the optimum quantity of sodium stearoyl-2-lactylate, may be necessary to obtain equivalent quality in the final baked or fried product.

Typically, bread dough is made up of wheat flour, salt, yeast, sugar, shortening and water. In addition, oxidizers such as potassium bromate are used to assure more uniform results. The present invention contemplates incorporation of a protein supplement into the bread dough as an additive thereto, although in certain circumstances it may be desirable to substitute a quantity of a protein supplement for a part or all of the wheat flour normally incorporated into the bread or baked or fried goods recipe depending upon the nature of the protein additive. Use of from 0.1% to 3% sodium stearoyl-2-lactylate, calcium stearoyl-2-lactylate, or the ethoxylated glyceride composition in the dough composition permits incorporation of a wide range of protein additives at various levels of addition, in the bread or baked or fried goods dough with the amount of lactylate or glyceride required being somewhat dependent upon the quantity of protein additive introduced into the composition. In most instances though, utilization of 0.5% of an additive such as sodium stearoyl-2-lactylate, calcium stearoyl-2-lactylate or the ethoxylated glyceride composition based on the weight of wheat flour provided in the composition, is adequate for permitting addition of a protein supplement in an amount to provide an absolute protein value of wheat flour.

For example, when bread is prepared by the standard sponge dough method as prescribed by the American Association of Cereal Chemists using a formula comprising in parts by weight, 100 parts of wheat flour, 12 parts of soy flour, 2 parts of yeast, 5 parts of sugar, 2 parts of salt, 0.5 part of a yeast food containing an oxidizing agent such as potassium bromate (for example Arkady yeast food), and 0.5 part of sodium stearoyl-2-lactylate, the resulting product compares very favorably with bread made from the same formula minus the soy flour and the lactylate additive.

Baking tests have shown that when the standard bread formula specified immediately above is supplemented with 12% soy flour (baker's weight) the addition of 0.5% sodium stearoyl-2-lactylate (baker's weight) cause the specific volume of a loaf of bread made from wheat flour supplemented with the soy flour to increase from 5.38 where no lactylate additive is used, to 6.25 cc./g. when the lactylate is added to the formulation. The latter figure represents a volume that is even larger than bread made from the same amount of wheat flour without soy supplementation. In this case, it can readily be appreciated that a significant amount of protein has been added to the bread composition since the soy contains 52.7% protein.

The two comparative tests were run using a modified straight dough preparation process as defined by the American Association of Cereal Chemists. The ingredients were added to a McDuffee mixing bowl and mixed for 30 seconds at No. 1 Speed in a Hobart Mixer, followed by further mixing at No. 2 Speed. After removal of the dough from the mixing bowl, it was allowed to ferment for 75 minutes. 525 gms. of the dough were allowed to relax for 20 minutes at 86° F., and then molded to loaf form by machine. The molded form was proofed at 86° F. for 70 minutes and then baked at 425° F. for 30 minutes.

Although the specific baking tests referred to above were carried out according to the standard sponge dough test officially approved by the American Association of Cereal Chemists with only slight modifications therefrom, the baking results obtained are valid not only for the sponge dough method but also for the continuous mix, short-time, no-time, and straight dough methods.

It is common practice in the baking industry to regard "specific loaf volume" as an important parameter for gauging the marketability of bread. A marketable bread should have a specific volume over 6.00 cc./g., provided it also has acceptable appearance, crumb texture, grain and organoleptic properties. Although incorporation of 12% soy flour (baker's weight) into bread dough is adequate for most commercial purposes, it has been found that the level of soy flour can be increased to 16% if desired using only 0.5% sodium stearoyl-2-lactylate as an additive for use therewith, and levels as high as 20% soy flour can readily be adopted although in this instance it may be desirable to slightly increase the amount of lactylate used to assure retention of the necessary physical and taste properties of the bread. Similar results were obtained using 0.5% of polyoxyethylene (20) mono- and diglycerides of $C_{14}$–$C_{18}$ fatty acids. Usually, the amount of calcium stearoyl-2-lactylate added should exceed the level of sodium stearoyl-2-lactylate in the same dough formulation to obtain generally equivalent results.

An almost limitless number of blends or premixes combining wheat flour and protein supplements may be used in accordance with the concepts of this invention, particularly from the standpoint of the quantity of supplement added or substituted for wheat flour.

For most purposes though, it is preferred that the amount of protein rich additive added to the bread composition be at a level to provide an amount of protein in the finished product in the range of at least 4 to 8 percent. However, addition of certain protein rich additives to provide for protein rich additions outside the above range may be desirable for certain products. Incorporation of sodium stearoyl-2-lactylate, calcium stearoyl-2-lactylate, or the ethoxylated glyceride additive into the bread, or baked or fried product dough provides product improvement over a much wider range of protein supplementation than has heretofore been possible.

The lower limit of protein supplementation which does not require addition of the sodium or calcium salts of an acyl lactylate of $C_{14}$–$C_{22}$ fatty acids, or the ethoxylated glyceride additive thereto is that amount which does not adversely affect the finished product in the absence of the lactylate additive. Although the protein supplementation which may be carried out without addition of sodium or calcium stearoyl lactylate, or the ethoxylated glyceride composition to the formulation obviously varies in accordance with the supplement incorporated into the mixture, the upper limit of protein supplementation without inclusion of the lactylate or glyceride additive therein is usually about 2% by weight of protein added to the dough. The upper limit of protein supplementation along with addition of the acyl lactylate or glyceride additive to the formula is usually dictated primarily by economic considerations. Normally, it is not essential to go above about 12% by weight of protein added to the final bread, baked or fried dough products. Thus, when the protein supplementation is at a level of about 2¼% or more (total protein added to the finished product) an additive as set forth herein should be employed at a concentration within the range of 0.1% to 3%.

Sodium stearoyl-2-lactylate is generally prepared by admixing lactic acid in an aqueous medium to commercial grade stearic acid (an admixture of myristic, palmitic and stearic fatty acids) at a sufficiently elevated temperature to remain in a molten condition. In general, 1.0 equivalent of fatty acid is used for each 1.2 equivalents of lactic acid as monomer for each lactyl group desired. In this case therefore 2.4 equivalents of lactic acid are provided for each 1.0 equivalent of fatty acids. The mixture is stirred with heating whereupon about 1 equivalent of sodium hydroxide is added. The mixture is then heated to bring the temperature thereof up to about 200° C. to complete the reaction. The reaction is carried out under an atmosphere of an inert gas to remove water vapor and prevent oxidation of the stearic acid. A solid, slightly cream colored material is produced upon cooling of the reaction products and it is then ground to a fine powder for use. The powder is a mixture of sodium salts of a homologous series of stearoyl lactylic acids, in which the number of lactyl groups in the molecule is a function of the relative ratios of the constituents brought into admixture. Calcium stearoyl-2-lactylate is prepared in a similar manner except that calcium carbonate is used as the neutralization agent.

The respective reaction mixtures will contain unreacted lactic acid and lactylates, unreacted stearic acid, polylactylates and their salts. A specific procedure for producing sodium stearoyl-2-lactylate of which the numeral 2 indicates the average number of lactyl groups in the molecule, is set forth in detail in U.S. Pat. No. 2,789,992 insofar as stearoyl-2-lactylic acid ester is concerned and Pat. No. 2,733,252 which described not only the preparation of sodium stearoyl-2-lactylate from stearic acid, sodium bicarbonate and lactylic acid, but also sets forth the parameters for production of the calcium lactylate composition. It is to be understood in this respect that although best results have been obtained by using sodium stearoyl-2-lactylate, and to a slightly lesser degree, calcium stearoyl-2-lactylate, other equivalent lactylates may be employed in this invention including those stearoyl lactylates, and particularly the sodium and calcium lactylates having a different average number of lactyl groups in the molecule then is the case in the preferred lactylate additives specified herein. For example, the average number of lactyl groups can be less than 1.0 although a larger quantity of the additive must be employed for equivalent effectiveness. Specifications for the preferred acyl lactylate sodium stearoyl-2-lactylate are set forth in food additive regulation 21 CFR § 121.1211.

The ethoxylated glyceride additive which can be used in lieu of one of the acyl lactylates specified to obtain equivalent results is described in detail in U.S. Pat. No. 3,490,918 and particularly in Example I thereof. As is clear from the disclosure of such patent, the glyceride additive is commonly referred to as a monoglyceride product but is in fact a mixture primarily made up of ethoxylated mono- and diglycerides combined with very minor amounts of triglycerides and glycerine. The additive is prepared from hydrogenated tallow (or hydrogenated soybean oil) by reacting the mixture of $C_{14}$–$C_{18}$ fatty acids with glycerine in the presence of potassium hydroxide. The crude "monoglyceride" thus prepared is reacted with ethylene oxide and the reaction products neutralized and a filtrate removed, ethoxylated "monoglyceride" (20 mole adduct) having an ethylene oxide content of from about 60 to 68% on an anhydrous basis. The hydroxyl value is between 65–80, the saponification number between 65–75 and the acid value below 2.

As indicated in Pat. No. 3,490,918, although the preferred glyceride additive is derived from hydrogenated tallow or its equivalent, the "monoglyceride" can be produced from a number of fatty acids or mixtures thereof containing from 10–24 but preferably 14–18 carbon atoms. The fatty acids can be saturated or unsaturated but are preferably saturated. The polyoxyethylene content of the additive can vary widely, i.e. from 10–95% on a weight basis. A more preferred content is from 25–80% with optimum results being obtained from a 45–75% range. Thus the additive comprises the condensation product of from 10–95 parts by weight of ethylene oxide and correspondingly from 90–5 parts by weight of a partial glycerol ester of a $C_{10}$–$C_{24}$ fatty acid containing at least 10 percent monoglyceride content with diglycerides, triglycerides and glycerine constituting the balance. Specifications for the preferred ethoxylated glyceride additive are set forth in food additive regulation 21 CFR § 211.1221.

We claim:

1. A composition for preparing wheat flour based bread, baked or fried dough products comprising, in combination:

a quantity of wheat flour;

a protein supplement other than wheat flour but compatible therewith in the preparation of said bread, baked or fried dough products from said composition, a sufficient amount of said supplement being present to provide at least about 2¼% by weight of additional protein to the bread, baked or fried dough products produced from said composition; and from about 0.1% to 3% by weight based on the total weight of said wheat flour contained in said composition of the condensation product of from 10–95 parts by weight ethylene oxide and correspondingly from 90–5 parts by weight of a partial glycerol ester of a $C_{10}$–$C_{24}$ fatty acid containing at least 10 weight percent monoglyceride content with diglycerides, triglycerides and glycerine constituting the balance.

2. A composition as set forth in claim 1, wherein said additive comprises polyoxyethylene (20) mono- and diglycerides of $C_{14}$–$C_{18}$ fatty acids.

3. A composition as set forth in claim 1, wherein a sufficient amount of said supplement is present in the composition to contribute 4% to 8% by weight of protein to the bread, baked or fried dough product prepared from said composition.

4. A composition as set forth in claim 1, wherein a sufficient amount of said supplement is present in the composition to contribute up to one-half by weight of protein to the total protein content of bread, baked or fried dough product prepared from said composition.

5. A composition as set forth in claim 1, wherein said supplement is selected from the group consisting of soy flour, soy isolates, nonfat milk solids, whey products, fish protein concentrate, cottonseed flour, chick pea flour, sesame seed flour, corn-soy-milk blend flour, wheat protein concentrate, wheat gluten, defatted wheat germ, Torula yeast, wheat-soy blend flour, edible single cell proteins, and mixtures thereof.

6. A composition as set forth in claim 1, wherein said supplement is soy flour.

7. A composition as set forth in claim 1, wherein said supplement is nonfat milk solids.

8. A composition as set forth in claim 1, wherein said supplement is wheat protein concentrate.

9. A composition as set forth in claim 1, wherein said supplement is corn-soy-milk flour.

10. A composition as set forth in claim 1, wherein said supplement is cottonseed flour.

11. A composition as set forth in claim 1, wherein said supplement is soy flour and from about 6 to 18 parts by weight of said supplement are provided for each 100 parts by weight of said wheat flour.

12. A composition as set forth in claim 11, wherein at least about 12 parts by weight of said supplement are provided for each 100 parts by weight of said wheat flour.

13. A composition as set forth in claim 1, wherein is provided 0.5% by weight of said additive in said composition.

14. A method of supplementing the protein content of bread dough products, or other baked or fried dough products containing wheat flour comprising the step of:

incorporating into the dough prior to baking or frying thereof a quantity of a protein supplement other than wheat flour but compatible therewith in the preparation of bread, or other products therefrom, a sufficient amount of said supplement being added to provide at least 2¼% by weight of additional protein in the bread, baked or fried dough products; and providing from about 0.1% to 3% by weight of an additive based on the total weight of the wheat flour therein, the condensation product of from 10–95 parts by weight ethylene oxide and correspondingly from 90–5 parts by weight of a partial glycerol ester of a $C_{10}$–$C_{24}$ fatty acid containing at least 10 weight percent monoglyceride content with diglycerides, triglycerides and glycerine constituting the balance.

15. A method as set forth in claim 14 wherein said step of providing an additive in the dough comprises adding polyoxyethylene (20) mono- and diglycerides of $C_{14}$–$C_{18}$ fatty acids.

16. A method as set forth in claim 14, wherein the step of incorporating a protein supplement into said dough comprises adding a material selected from the group consisting of soy flour, soy isolates, nonfat milk solids, whey products, fish protein concentrate, cottonseed flour, chick pea flour, sesame seed flour, corn-soy-milk blend flour, wheat protein concentrate, wheat gluten, defatted wheat germ, Torula yeast, wheat-soy blend flour, edible single cell proteins, and mixtures thereof.

References Cited
UNITED STATES PATENTS 3,490,918    1/1970    Egan et al. _____ 99—123 X

OTHER REFERENCES

Tenney et al., "Sodium Stearoyl-2 Lactylate," The Bakers Digest, vol. 42, December 1968, pp. 38–42.

RAYMOND N. JONES, Primary Examiner

J. R. HOFFMAN, Assistant Examiner

U.S. Cl. X.R.

426—212